(12) United States Patent
Labriola, II

(10) Patent No.: US 9,350,216 B2
(45) Date of Patent: May 24, 2016

(54) INTEGRATED MULTI-TURN ABSOLUTE POSITION SENSOR FOR HIGH POLE COUNT MOTORS

(71) Applicant: Donald P. Labriola, II, La Verne, CA (US)

(72) Inventor: Donald P. Labriola, II, La Verne, CA (US)

(73) Assignee: QuickSilver Controls, Inc., San Dimas, CA (US)

( * ) Notice: Subject to any disclaimer, the term of this patent is extended or adjusted under 35 U.S.C. 154(b) by 568 days.

(21) Appl. No.: 13/729,814

(22) Filed: Dec. 28, 2012

(65) Prior Publication Data

US 2014/0184030 A1    Jul. 3, 2014

(51) Int. Cl.
*H02K 11/00* (2006.01)
*H02K 37/14* (2006.01)
*G01D 5/245* (2006.01)

(52) U.S. Cl.
CPC ............ *H02K 11/225* (2016.01); *G01D 5/2451* (2013.01); *H02K 37/14* (2013.01)

(58) Field of Classification Search
CPC ............ H02K 11/0031; H02K 11/225; H02K 11/00–11/048
USPC .......................... 310/68 B; 318/602, 603, 432
See application file for complete search history.

(56) References Cited

U.S. PATENT DOCUMENTS

| | | | |
|---|---|---|---|
| 3,820,090 A | 6/1974 | Wiegand | |
| 4,025,810 A | 5/1977 | Field | |
| 4,127,812 A | 11/1978 | Baliguet | |
| 4,247,601 A | 1/1981 | Wiegand | |
| 4,263,525 A * | 4/1981 | Lathlaen | 310/155 |
| 4,538,082 A | 8/1985 | Hinke et al. | |
| 4,779,075 A | 10/1988 | Zagelein et al. | |
| 4,910,475 A | 3/1990 | Lin | |
| 5,057,727 A | 10/1991 | Jones | |
| 5,159,218 A * | 10/1992 | Murry et al. | 310/68 B |
| 5,240,066 A | 8/1993 | Gorynin et al. | |
| 5,663,641 A | 9/1997 | Morita | |
| 6,084,400 A | 7/2000 | Steinich et al. | |
| 6,849,973 B2 | 2/2005 | Kurosawa et al. | |
| 7,041,911 B2 | 5/2006 | Marin Palacios et al. | |
| 7,075,196 B1 | 7/2006 | Labriola, II | |
| 7,098,654 B2 | 8/2006 | Mehnert et al. | |

(Continued)

OTHER PUBLICATIONS

Vazquez et al.,"Magnetic Properties of Glass-Coated Amorphous and Nanocrystalline Microwires", Journal of Magnetism and Magnetic Materials vol. 160, Jul. 1996, pp. 223-228.

(Continued)

*Primary Examiner* — Thomas Truong
(74) *Attorney, Agent, or Firm* — Fiala & Weaver P.L.L.C.

(57) ABSTRACT

Absolute multi-turn position sensing integrated within the structure of a hybrid stepper motor implemented by sharing the magnetic structure of the motor with the sensing means. An alternating magnetic field is obtained from a single magnet within the stepper motor rotor by use of alternating flux paths directed to large Barkhausen jump effect sensing elements. Pulses generated from the large Barkhausen sensing are decoded electronically and stored in a non-volatile memory to absolutely locate the motor position within a fraction of 1 electrical cycle of the motor over an arbitrary range. This coarse position sensing can optionally be extended by use of a higher resolution absolute within-electrical-cycle sensing means to provide integrated high resolution position sensing over an arbitrary number of revolutions.

22 Claims, 10 Drawing Sheets

(56) References Cited

U.S. PATENT DOCUMENTS

| | | | |
|---|---|---|---|
| 7,538,460 | B2 | 5/2009 | Labriola, II |
| 7,579,829 | B1 | 8/2009 | Wong et al. |
| 8,111,065 | B2 | 2/2012 | Mehnert et al. |
| 2006/0197393 | A1* | 9/2006 | Labriola ............ 310/68 B |
| 2010/0213927 | A1 | 8/2010 | Mehnert et al. |
| 2011/0006757 | A1 | 1/2011 | Mehnert |
| 2011/0156699 | A1 | 6/2011 | Shibata et al. |
| 2011/0184691 | A1 | 7/2011 | Mehnert et al. |

OTHER PUBLICATIONS

Dlugos, "Wiegand Effect Sensors Theory and Applications", retrieved from <http://archives.sensorsmag.com/articles/0598/wie0598/index.htm>, May 1998, 5 pages.

Infante et al., "Double large Barkhausen jump in soft/soft composite microwires", Journal of Physics D: Applied Physics, Aug. 9, 2010, 6 pages.

* cited by examiner

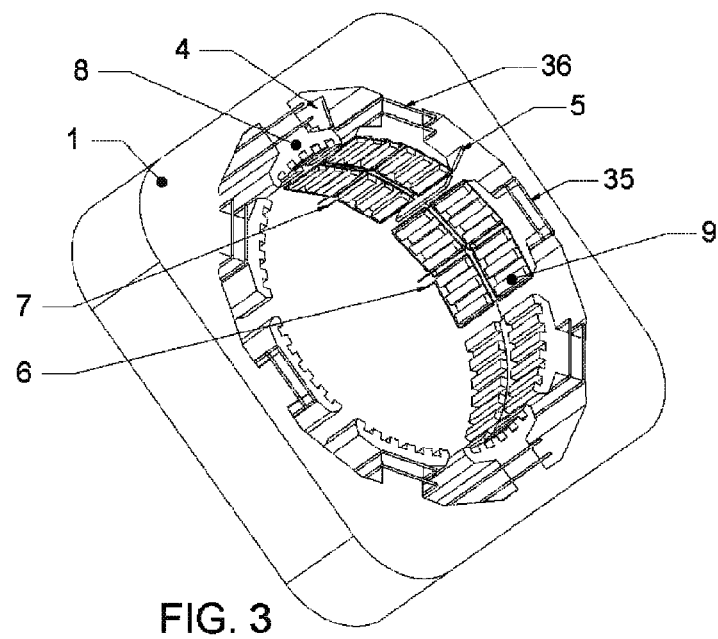
FIG. 3
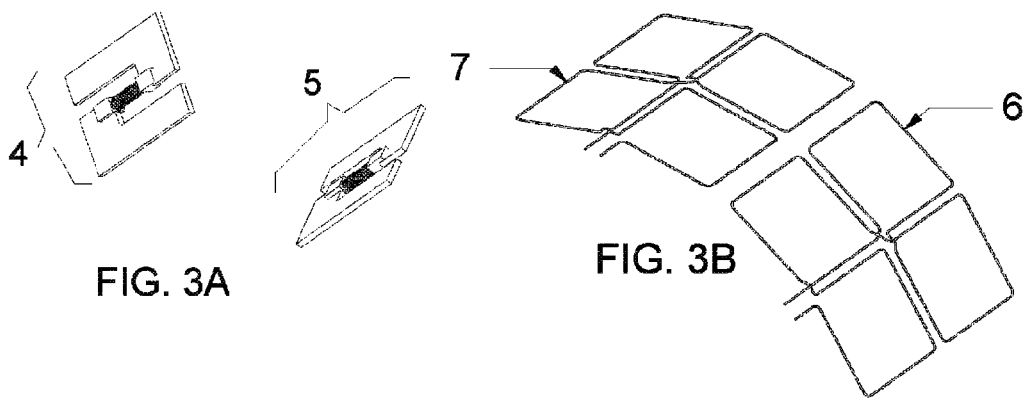
FIG. 3A
FIG. 3B

INTEGRATED MULTI-TURN ABSOLUTE POSITION SENSOR FOR HIGH POLE COUNT MOTORS

BACKGROUND

1. Field of the Invention

This invention concerns a high pole count motor having an integrated absolute magnetic position feedback, which, with related electronics, is capable of providing absolute position sensing over an arbitrary number of rotations of the motor. The multi-revolution absolute position feedback may be combined with a high resolution partial revolution feedback to provide high resolution feedback over an arbitrary number of rotations of the motor. The magnetic circuits of both the multiple revolution capable feedback and the high resolution partial revolution feedback are based on the existing motor magnetic circuits.

2. Description of the Related Art

Motors are used in a variety of applications for effecting the controlled motion of objects. For example, motors are used in a variety of industrial automation and other automation applications. In many applications, it is useful to provide the motor or the motor's controller with an accurate measure of the motor position to allow for greater precision in positioning objects with the motor. In many applications it is advantageous to know the absolute position of the motor upon application of power, even if the motor has been moved while system power was turned off. In closed loop systems, one or more sensors collect position, velocity or acceleration information about a motor and provide that information to the motor controller. A closed-loop control system within the motor controller receives the motor position or other information as feedback and improves the accuracy of the positioning or movement characteristics of the motor. Motors whose operation is affected by feedback and under closed loop control are often referred to as servomotors.

Absolute multi-turn position feedback can be obtained by a number of methods, including the use of multiple encoder sections or resolver sections with mechanical gearing between them, the use of sensors with battery backup and electronic counters, and the use of magnetic pulse generators to sense position movement and, optionally, to provide the energy needed to count the number and sequence of pulses so as to track shaft position.

The resolution of the absolute position sensors is often improved by combining the value of a coarse absolute position sensor with those of a fine position sensing method that provides an absolute position within a limited period or portion of a revolution. Provided that the coarse position sensing method is able to determine the position to within a fraction of a cycle of the fine position sensing method, the data from these two sensors may be combined by electronic means to provide high resolution position feedback over a wide absolute range of positions.

The combination of higher resolution cyclic absolute position sensors with coarse multi-turn absolute position sensors is well known in the art. Wong in U.S. Pat. No. 7,579,829 describes the combination of high resolution absolute-cyclic position sensing with lower resolution multi-turn absolute position sensing. The lower resolution absolute position sensing is obtained by using multiple resolvers coupled together by mechanical gearing. Shibata et al. in US Patent Application Pub. No. US 2011/0156699 A1 describes a similar multi-turn absolute position sensing method using multiple resolver sections mechanically coupled through gearing. There are multiple patents based on variations of the mechanical gearing method.

Jones in U.S. Pat. No. 5,057,727 describes a "Shaft Position Sensor Employing a Wiegand-effect Device." In particular, U.S. Pat. No. 5,057,727 teaches the use of multiple Wiegand effect sensors to determine the coarse position of a toothed magnetically soft wheel, with the magnetic field needed for the Wiegand effect device provided by a non-wheel mounted magnetic source. The non-wheel mounted magnetic source may either be a permanent magnet or a solenoid. The phasing of the signals from the multiple Wiegand sensors provides incremental position information. The operation of the Wiegand wire, which is the basis of the Wiegand effect sensors, is described in U.S. Pat. No. 3,820,090 to Wiegand as well as in U.S. Pat. No. 4,247,601 to Wiegand. The Wiegand sensor is comprised of a Wiegand wire surrounded by a coiled sensing wire. The sensing wire produces a strong distinct pulse when the magnetized state of the inner core of the Wiegand wire is abruptly reversed upon the weakening or reversal of the applied magnetic field following the application of a sufficiently strong magnetic field to the sensor. Sensors based on this effect are well known in the art including U.S. Pat. No. 4,538,082 to Hinke et al.

Mehnert et al. in U.S. Patent Application Pub. No. US 2010/0213927 describe an absolute magnetic position encoder using a coarse magnetosensitive position sensor, such as a Hall effect sensor, sensing multiple permanent magnets of alternating polarity affixed to the body to be monitored, with the power to operate the control logic and non-volatile counters provided by a single Wiegand element. This coarse position sensor is combined with a magnetosensitive fine sensor, such as a Hall effect sensor, to provide a higher resolution portion. These are combined in electronic logic to provide a high resolution multi-turn encoder that does not require external power to maintain its absolute position count.

Menhert et al. in U.S. Pat. No. 8,111,065 describe a combination Wiegand effect sensor driven by a gear from the main shaft to produce multiple power pulses per revolution, with the pulses being counted to provide a coarse absolute position means. An absolute one turn encoder, resolver, or Hall effect position sensor means is used to provide a higher resolution means with the high resolution cyclic and the low resolution absolute count combined to provide an absolute position sensing means. The pulses from the Wiegand effect device are used to power the coarse absolute count electronics so that no external electrical power is required to track the coarse motion of the input shaft.

Mehnert in U.S. Patent Application Pub. No. US 2011/0006757 A1 describes the combination of a single Wiegand effect pulse generator contained within a ferro-magnetic ring with affixed magnets on the inner surface to generate alternating magnetic fields to the Wiegand effect device. An additional sensor is used to determine the direction of motion to generate the signals to the up/down counter for the coarse position, as well as functioning as the fine resolution portion of the position feedback.

Mehnert et al. in U.S. Patent Application Pub. No. US 2011/0184691 further teaches the electronics needed to process and combine the absolute position sensor described in U.S. Patent Application Pub. No. US 2011/0006757. For the coarse sensor, a single Wiegand effect sensor is combined with a Hall effect type device, with the Hall effect device powered from the Wiegand effect sensor. The hysteresis of the Wiegand device is used advantageously with the Hall effect device to determine the direction of rotation, as the hysteresis involved with the Wiegand device causes the Wiegand device signal to be out of phase with respect to the magnetic field as measured by the Hall effect device, according to the direction of rotation.

Zägelein et al. in U.S. Pat. No. 4,779,075 describes a device for absolute displacement determination using three Wiegand or large Barkhausen effect devices using non-volatile memory to determine actions based on prior pulses and a counter to store cycle counts, combined with an absolute-over-single-revolution position sensor attached to the shaft of the revolution counter. The center Wiegand device (S3) in U.S. Pat. No. 4,779,075 is used as a pre-trigger enable, and then the first pulse to either of the other Wiegand devices (S2 or S1 as identified in U.S. Pat. No. 4,779,075) is used to operate the counter up or down. In this manner, multiple pulses from the same Wiegand device are ignored if they occur without sufficient rotation to first engage S3.

Morita in U.S. Pat. No. 5,663,641, teaches a rotational speed detection unit with a Wiegand effect or amorphous magnetostriction wire sensor magnetically coupled between alternating poles of a tone wheel. The outer periphery of the tone wheel has alternative N and S poles, with a uniform pitch, such that the detection unit spans between a pair of magnets of opposing polarization. The polarities that are spanned alternate as the wheel is rotated, producing a series of pulses.

SUMMARY

The present invention is directed to an integrated multi-turn absolute position sensor for high pole count motors, substantially as shown in at least one of the figures and/or described herein in connection with at least one of the figures, as set forth more completely in the claims.

BRIEF DESCRIPTION OF THE DRAWINGS

FIG. 3 shows a backside view of the motor of FIG. 1 that displays a stator structure and placement of the fine sensor pickup coils and coarse sensing elements thereof.

FIG. 3A shows the coarse sensing elements of the motor of FIG. 1 in isolation in the same perspective as FIG. 3.

FIG. 3B shows the fine sensor pickup coils of the motor of FIG. 1 in isolation in the same perspective as FIG. 3.

FIG. 4A shows the rotor assembly from a side view to show the placement of rotor pole cap to rotor magnet. FIG. 4B shows alignment of the teeth and gaps of the upper rotor pole cap with respect to the lower rotor pole cap. FIG. 4C shows a cut-away view of the rotor assembly, showing the alignment of the teeth and gaps between the upper and lower rotor pole caps.

DETAILED DESCRIPTION

1. Introduction

Figure 1:
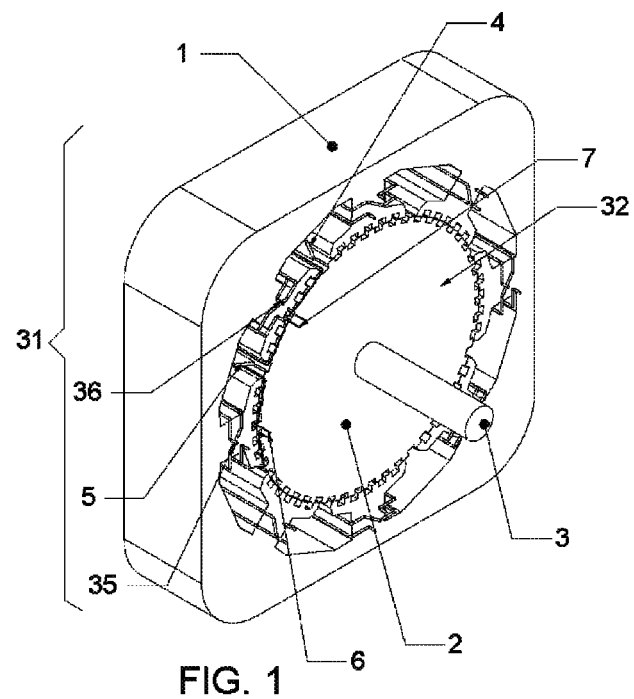
FIG. 1 shows an isometric view of a motor with integrated fine sensor pickup coils and coarse sensing elements in accordance with an embodiment.

Aspects of the present invention are discussed herein in terms of a synchronous, high pole count motor. High pole count synchronous motors have certain properties that are used advantageously in some implementations of the present invention. U.S. Pat. No. 4,025,810, entitled "Low Noise Synchronous Motors," describes basic aspects of the configuration and operation of a stepper motor that are useful to this discussion. Such motors are sometimes referred to as step motors or stepper motors, and can be operated in an open loop configuration, in a quasi-closed loop configuration, and/or in a full closed loop configuration. In each such configuration, drive currents are applied to stator phase windings. The open loop operation does not modify the drive currents applied to the stator phase windings based on position feedback. The quasi-closed loop configurations modify the phase of the currents applied to the stator phase windings so as to prevent the loss of steps and synchronization of the rotor, typically by limiting the difference between the driving phase and actual rotor position to no more than approximately plus or minus 1.5 full steps of the motor. Full closed loop operation varies both the phase and magnitude of the currents applied to the stator phase windings based on the actual position versus the desired position, commutating the motor so as to optimize the available torque constant.

The feedback provided by embodiments of the present invention is obtained from coarse sensing elements, and optionally, from fine sensor pickup coils. In certain implementations, the coarse sensing elements produce narrow pulses, of approximately fixed amplitude, with the amplitude independent of rotational speed. The pulses from such coarse sensing elements, when decoded using both the polarity of the received pulse and the history of previous pulses, can provide four locations per electrical cycle of the motor when two coarse sensing elements are used. Additional sensors may be used to increase resolution or to provide redundancy.

In the configurations described herein, the transitions of the coarse sensing elements occur at approximately full step intervals, that is one quarter of an electrical cycle, and with a phase offset of one half step from the wave (single phase energized) full step steady state locations. Full step motions for the motor described herein correspond to 1.8 degrees of mechanical movement, although other resolutions, both finer and coarser, are in common use and may be used with this invention. The coarse sensing elements may be used without the fine sensor pickup coils to prevent loss of synchronization of the step motor, as in quasi-closed loop operation, or simply to determine the location of the motor to within one step. They may also be used in conjunction with the fine sensor pickup coils.

With the use of a non-volatile counter, either externally powered with a battery or other backup means, or powered from the sensor pulses themselves, the absolute position of the motor across an arbitrarily large range of motion may be determined. For example, 48 bits of coarse resolution counting could uniquely track the motions within 1 step of a typical 1.8 degree motor running at 4000 RPM for over 100 years, with a tracking resolution of 200 positions per revolution, and still have bits to spare. This not to indicate that the rest of the electronics and mechanics would survive for a century, just that as few as 48 bits of memory would more than suffice this requirement.

The coarse sensing element position information may be combined with the fine resolution feedback from the fine sensor pickup coils to provide fine position information over an arbitrarily large range of motion. The fine position feedback in this invention is based on U.S. Pat. No. 7,075,196 B1 and its related family of patents.

The coarse sensing elements described herein do not require electrical power to monitor the position of the rotor with respect to the stator, which is important to minimize or eliminate external power usage when the power to the controller has been removed. The pulses generated by the coarse sensing elements may be used to wake-up a low power processor or to actuate a low power counter operating on stored energy. Alternatively, the pulses from the coarse sensing elements may be harvested to power a non-volatile counter means thereby allowing the elimination of long term energy storage, such as batteries.

In systems combining the fine sensor pickup coils and the coarse sensing elements, the coarse sensing elements may be configured to provide sufficient resolution to unambiguously determine position within the range of the fine sensor pickup coil. The fine sensor pickup coil need only be powered when there is power present to control the motor.

Embodiments described herein may be smaller and less complex than prior art multi-turn position-sensing solutions because such embodiments make use of the existing magnetic structure of the motor. This approach inherently matches the resolution of the multi-turn position sensing to that of the high pole count motor and does not require additional alignment steps in production. The transition points of the absolute multi-turn sensing means are well matched for quasi-closed loop operation in which the motor's drive angle is kept to within approximately plus or minus 1.5 steps of the rotor angle to prevent losing synchronization. Optimal torque when full stepping occurs by keeping the stator magnetic field nominally between 0.5 and 1.5 steps ahead of the electrical angle of the rotor. In accordance with certain embodiments, the coarse sensor is also well suited for combination with a high-resolution limited range cyclic absolute sensor to provide full closed loop servo operation with fine resolution over an arbitrary number of motor revolutions.

The use of the motor's own magnetic structure as described above saves cost and space not only in the elimination of many additional components, but also in removing the need to magnetically shield the prior-art sensing means from the motor structure to prevent interference of the motor fields to the previously described sensing means.

The prior art solutions do not teach a configuration capable of directly measuring the position with sufficient resolution of the rotor of a typical 1.8 degree step motor with respect to its stator. Such solutions require additional wheels and magnets to be added, and do not provide the combination of fine resolution with the reduced footprint of embodiments of the present invention.

Certain embodiments of the invention avoid a limitation of the Wiegand device: the existence of both a strong pulse and a weak pulse associated with the operation Wiegand effect device. The strong pulse and weak pulse effect is taught by Wiegand in U.S. Pat. No. 4,247,601. The weak pulse is described as reverse core switching shown as R in FIG. 3 of U.S. Pat. No. 4,247,601 and the strong pulse is described as the confluent core switching, and labeled as the large pulse C in FIG. 3 of U.S. Pat. No. 4,247,601. This effect is also described in significant detail in "Brushing Up: Magnets and Electromagnetics," Motion System Design, page 18 (available at http://motionsystemdesign.com/Magnetism.pdf). Starting with the sensor reset (i.e., with the soft iron central core of the Wiegand device and the magnetically hard outer core both in the same magnetic orientation in the presence of a strong resetting field), when the external field is reversed, first the soft core reverses its orientation in a very fast cascade, typically lasting on the order of 10 uS and producing a large pulse. As the field continues to increase, the outer magnetically hard sheath reverses orientation, causing a second weaker pulse. At this point the sensor is reset. As the field again weakens and reverses, first the soft inner core reverses, causing a strong pulse in the reverse direction, and then the outer magnetically hard shell reverses, causing a second weaker pulse in the reverse direction. This returns the device to its initial reset condition. The device can also be operated without reversing the applied field, such that only the magnetic field of the core is switched, producing strong pulses of only one polarity.

Embodiments of the present invention preferably makes use of a bi-stable, single jump Barkhausen effect sensor wire, as described in "Magnetic properties of glass-coated amorphous and nanocrystalline microwires", M. Vazquez and A. P. Zhukov, Journal of Magnetism and Magnetic Materials 160 (1996) 223-228. These devices surround an inner core magnetic core with a glass sheath. The inner magnetic core is typically 3 to 50 micrometers diameter, of preferably amorphous or of very fine grain structure, made from Fe rich core alloy. The magnetic core is surrounded by a glass sheath that was co-extruded with the inner wire core. Rapid cooling causes the wire to have an amorphous state while simultaneously locking in stresses due to the differences in thermal expansion coefficients between the glass and the wire. The glass coated wire is made in a method similar to that taught by Gorynin et al in U.S. Pat. No. 5,240,066.

The use of an Fe rich alloy exhibiting a positive magnetostriction constant appears to aid in producing a bi-stable magnetic element with an almost perfectly rectangular B-H curve and having very fast switching between polarization states. As these devices do not have a secondary hard magnetic shell to switch at higher field strengths, they do not have secondary weak pulses associated Wiegand sensors. Further, this bi-stable magnetism, with its single sharp transition in each direction, is available using sensor wires of much shorter length—as small as 2 mm for 10 micrometer diameter wire—allowing for their use in more compact systems. The output signal strength increases with wire cross sectional area, so there is a tradeoff between diameter and minimum length for bi-stable operation.

Although certain embodiments described herein use the single large Barkhausen jump sensors, other large Barkhausen jump sensors such as Wiegand effect wires and similar large Barkhausen jump sensors may be used in alternative embodiments.

The prior art solutions do not provide sufficient resolution in a compact configuration for a self-powered coarse absolute sensor which may be combined with the high resolution sensor of U.S. Pat. No. 7,075,196 B1, which is also integrated with the basic magnetic structure of the stepper motor.

The use of a self-powered coarse sensor of sufficient position resolution to not lose motor step count is of great use in applications such as solar tracking, where the minimization of consumed power within the system leads to maximized power delivered to the grid. Smaller system size and weight is also often an advantage in this as well as many other systems. In such a system, the fine resolution encoder as well as the motor need not be energized unless sufficient position error from the desired position has been observed through the self powered coarse position sensor, reducing the energy consumption related to solar tracking.

2. Description of First Exemplary Implementation

Figure 12:
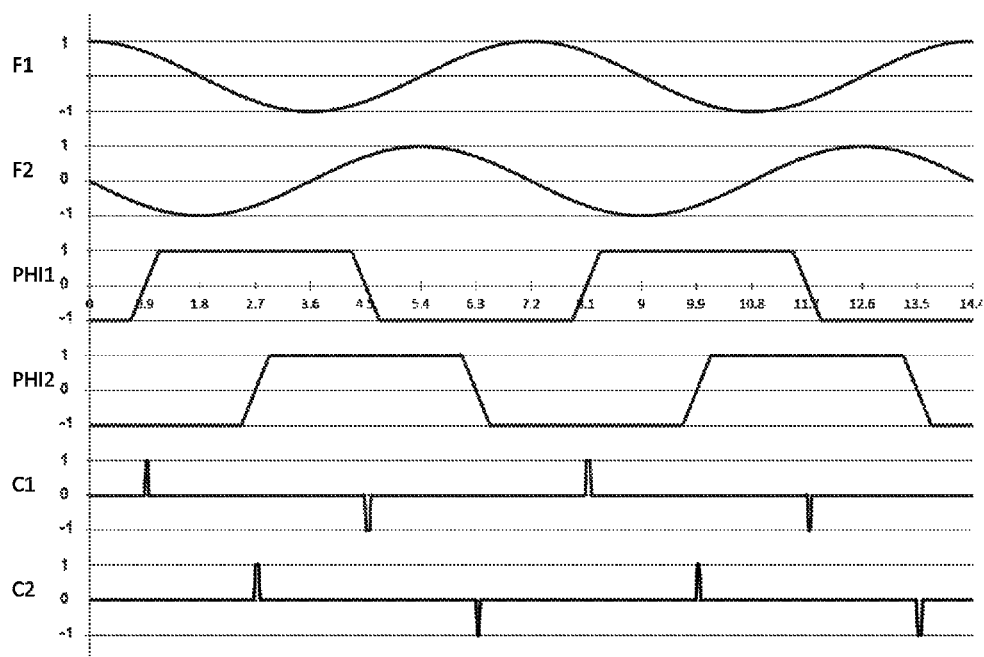
FIG. 12 shows fine sensor pickup coils normalized decoded outputs F1, F2, coarse sensing element normalized flux PHI1, PHI2, and coarse sensing element normalized outputs C1, C2, all plotted against mechanical shaft angles in degrees per rotations shown in FIG. 7A-D, for a 2 phase 1.8 degree stepper motor.

FIG. 1 shows an isometric view of a stepper motor 31 with integrated fine sensor pickup coils 6 and 7 and coarse sensing elements 4 and 5 based on the Large Brokhausen Jump (LBJ). It is noted that the motor end-bells and bearings, which are well known in the art, are not shown in FIG. 1 for the sake of clarity. Stepper motor 31 is a common 1.8 degree stepper with micro-stepping capable laminates, although the invention is not limited to this particular motor type. Stepper motor 31 comprises a rotor 32 and stator 1. As rotor 32 rotates within stator 1, both the magnitude and polarity of a magnetic field that is applied to the two coarse sensing elements 4 and 5 of stepper motor 31 successively varies in a truncated sine and cosine manner for the two coarse sensing elements respectively, as depicted in FIG. 12. The period of the cycles corresponds to the electrical cycle of stepper motor 31 which is four full electrical steps or 7.2 degrees mechanical for stepper motor 31. A stator phase winding A 35 of stepper motor 31 corresponds to the A phase and is wound with alternating sense to the coils on alternating A phase poles—0 degrees, 90 degrees, 180 degrees, and 270 degrees—as is well known in the art of stepper motors. A stator phase winding B 36 of stepper motor 31 corresponds to the B phase and is wired with alternating sense to the coils on alternating B phase poles—45 degrees, 135 degrees, 225 degrees, and 315 degrees, as can be seen by looking at the front face of stepper motor 31. Alternate configurations are possible including three, four, five and other numbers of motor phases. A coarse sensing method in accordance with an embodiment of the present invention is compatible with various numbers of driving phases. The individual windings within stator phase winding A 35 may be wired in series, in parallel, or some combination thereof. The same flexibility also applies to stator phase winding B 36. Alternate winding interconnection methods may be used along with variation of the wire gauge and the number of turns to configure the desired motor operating voltages and currents for a particular motor.

Figure 2:
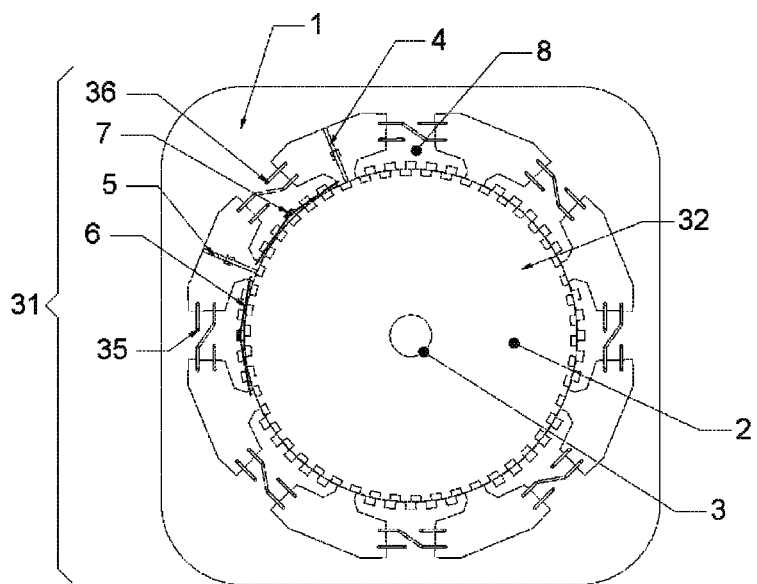
FIG. 2 shows a front perspective view of the motor of FIG. 1.

FIG. 2 shows a front face view of stepper motor 31 with integrated coarse sensing elements 4 and 5 and fine sensor pickup coils 6 and 7. Coarse sensing elements 4 and 5 are situated such that they span between an outside magnetic return at a backside of stator 1 and nearly to rotor 32, with only a small gap between an inside end of each coarse sensing element and a face of rotor 32.

Fine sensor pickup coil 6 responds to flux changes derived from stator phase winding A 35. The flux is sensed in a differential manner by fine sensor pickup coil 6, while flux derived from stator phase winding B 36 is sensed by fine sensor pickup coil 7. Although stator phase windings 35 and 36 are shown as 2-turn windings for ease of illustration, it is to be understood that these stator phase windings may have more turns and may consume much of the space surrounding each of stator pole pieces 8.

FIG. 3 shows stator 1 with both coarse sensing elements 4 and 5 and fine sensor pickup coils 6 and 7 from a backside isometric view of stepper motor 31. The currents through the various stator phase windings 35 and 36 that surround each of stator poles pieces 8 are modulated to generate relative motion between rotor 32 and stator 1. Rotor 32 and its various components have been hidden in this view to allow better visibility of stator 1 and the positioning of the coarse sensing elements 4 and 5 and the fine sensor pickup coils 6 and 7.

FIG. 3A provides a clearer view of the orientation of coarse sensing elements 4 and 5, which are shown in the same orientation as in FIG. 3.

FIG. 3B shows a simplified view of fine sensor pickup coils 6 and 7 as adapted for use with micro-stepping optimized stepper motors. Fine position sensing coil 7 senses a portion of the flux derived from stator phase winding A 35 on the adjoining stator pole piece 8. Fine position sensing coil 6 senses a portion of the flux from stator phase winding B 36 in a like manner. It is noted that the upward and right hand facing view from this perspective corresponds to the back side view of FIG. 1 and the bottom side view of FIG. 2.

Figure 4A:
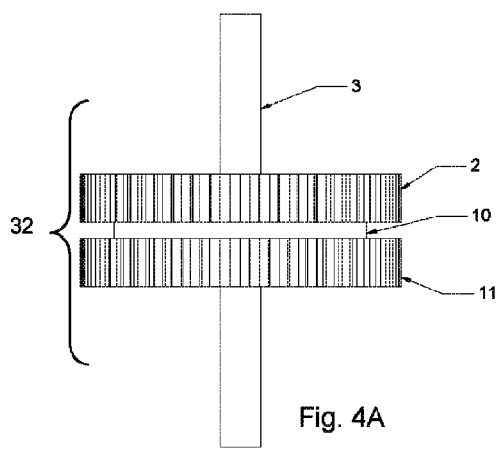
FIGS. 4A, 4B, and 4C show the rotor assembly of the motor of FIG. 1 from different perspectives. In particular.

FIG. 4A shows a side view of rotor 32 which includes a rotor shaft 3, a high permeability magnetically soft upper rotor pole cap 2, an axially polarized rotor magnet 10, and a high permeability magnetically soft lower rotor pole cap 11.

Figure 4B:
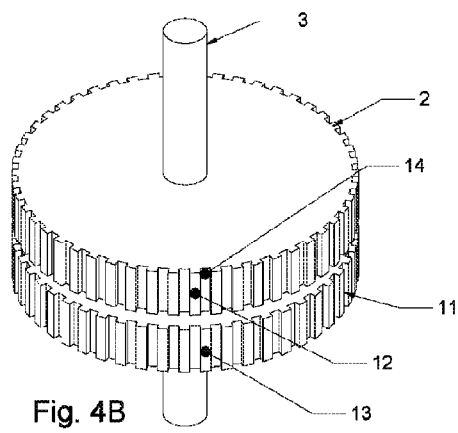

FIG. 4B shows a 3-dimensional view of rotor 32. This view shows the alignment between rotor teeth 12 and gaps 14 in upper rotor pole cap 2 with respect to rotor teeth 13 in lower rotor pole cap 11, which are positioned such that the teeth of one rotor pole cap align with the gaps in the other rotor pole cap and vice-versa.

Figure 4C:
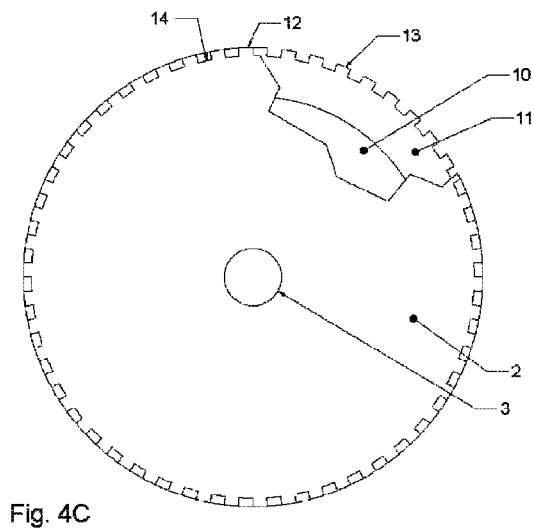

FIG. 4C shows a cut-away top view of rotor 32. Rotor magnet 10 is sandwiched between upper rotor pole cap 2 and lower rotor pole cap 11. Rotor teeth 12 of upper rotor pole cap 2 are offset so as to appear between rotor teeth 13 of lower rotor pole cap 11.

Figure 5:
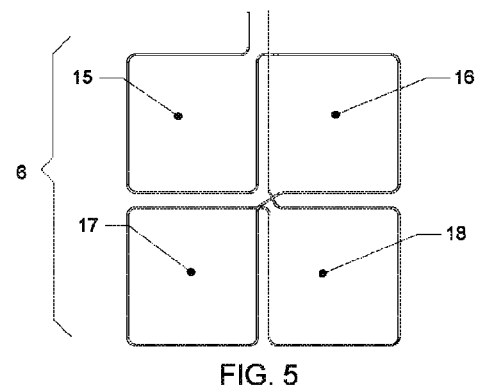
FIG. 5 shows an arrangement of fine sensor pickup coils useful in a step motor designed for micro-stepping operation in accordance with an embodiment.

FIG. 5 shows a more detailed view of fine sensor pickup coil 6. Fine sensor pickup coil 7 may be of a similar design and layout. Only a single turn of fine sensor pickup coil 6 is shown for the sake of clarity. However, fine sensor pickup coil 6 may have multiple turns. Fine sensor pickup coil 6 as shown in FIG. 5 has been optimized for micro-stepping capable stepper motors, such as stepper motor 31, although the design may vary for other motor types. Stepper motor 31 comprises stator poles pieces 8 with stator pole teeth 9 having a pitch that varies from a pitch of rotor teeth 12 and rotor teeth 13 of rotor pole caps 2 and 11, respectively. This variance in pitch from one to the other is intended to minimize the overall variation in the reluctance path between stator 1 and rotor 32, as rotor 32 is rotated with respect to stator 1, so as to reduce cogging and minimize torque ripple. Fine sensor pickup coil 6 shown in FIG. 5 takes advantage of the differences in the pitch of stator pole teeth 9 with respect to rotor teeth 12 of adjacent upper rotor pole cap 2 to both the left and right of the center line of stator pole piece 8. Fine sensor pickup coil 6 also senses the complementary alignment between stator pole teeth 9 of stator pole piece 8 and rotor teeth 13 of lower rotor pole cap 11. From the perspective of fine sensor pickup coil 6 shown in FIG. 5, an upper left loop 15 and lower right loop 18 of fine sensor pickup coil 6 are in phase with each other and of opposite phasing sense to an upper right hand loop 16 and lower left hand loop 17 of fine sensor pickup coil 6. Although this particular version of a fine sensor pickup coil is illustrated for a micro-stepping stepper motor, alternate implementations of fine sensor pickup coils are to be considered within the scope of the present invention. A fine sensor pickup coil may be deployed on one or more stator pole pieces per phase. Such use with multiple phases may be employed to minimize the effects of motor construction variations and runout.

Figure 6:
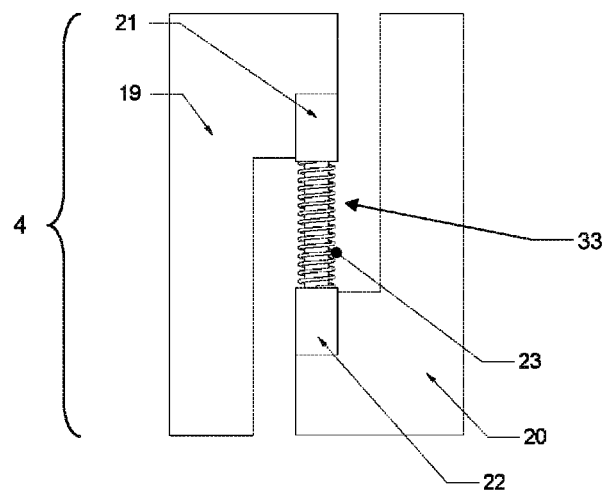
FIG. 6 shows a coarse sensing element construction with flux focusing elements in accordance with an embodiment.

FIG. 6 shows a detailed view of coarse sensing element 4, which in one embodiment comprises a large Barkhausen jump (LBJ) coarse sensing element. Coarse sensing element 5 may be of this same design as coarse sensing element 4. As shown in FIG. 6, coarse sensing element 4 includes a flux focuser 20. Flux focuser 20 is composed of a relatively high permeability magnetically soft material. Flux focuser 20 collects the flux from rotor teeth 12 and 13 of the two adjacent rotor pole caps 2 and 11, according to the respective spacing of the rotor teeth from the face of flux focuser 20. Such relative spacing varies periodically as rotor 32 is rotated. The high permeability material provides a low reluctance path for the differential flux to flow to a first coarse sensor end cap 22 of coarse sensing element 4. Similarly, a return flux focuser 19 of coarse sensing element 4 forms a low reluctance path from a second coarse sensor end cap 21 of coarse sensing element 4 to a back body of stator 1. The resulting magnetic field is impressed across a coarse sensor 33 of coarse sensing element 4. A sense coil 23 of coarse sensor 33 is shown in representative view. Sense coil 23 may typically consist of several thousand turns of very fine wire.

Figure 6A:
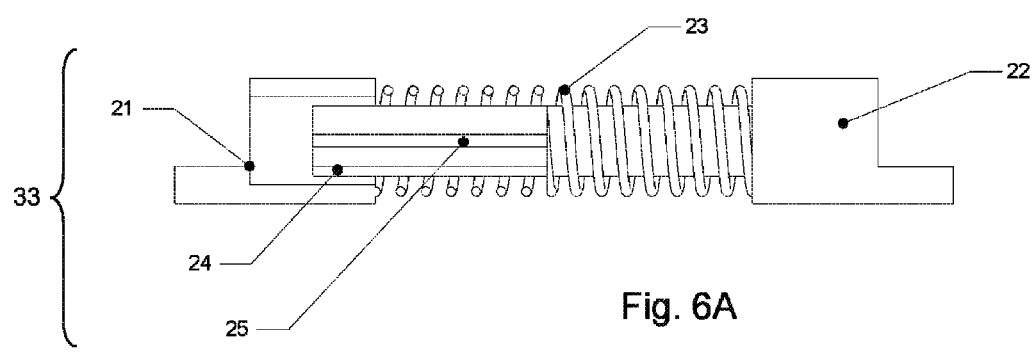
FIG. 6A shows a cut-away view of a coarse sensing element in accordance with an embodiment, the cut-away view exposing the internal construction of the coarse sensing element.

FIG. 6A shows coarse sensor 33 in cut-away view. Also shown in FIG. 6A are first coarse sensor end cap 21 and second coarse sensor end cap 22. The interior of each of first coarse sensor end cap 21 and second coarse sensor end cap 22 is hollowed out to help shield the ends of a large Barkhausen jump (LBJ) element 25 which forms a part of coarse sensor 33. This shielding of the ends of LBJ element 25 has been shown to increase the strength of a pulse sensed by sense coil 23 when portions of LBJ element 25 abruptly reverse their magnetic polarization. In an embodiment, LBJ element 25 is composed of a magnetic microwire embedded in a glass sheath to help promote bi-magnetic properties associated with a rectangular hysteresis loop. In alternate embodiments, other step response magnetic wires, including Wiegand wire sensing elements and single Brokhausen jump elements may be used. A protective tube 24, which may be composed of glass, is used to mechanically isolate LBJ element 25 from external mechanical strain, as external strain will alter the magnetic properties of LBJ element 25. Protective tube 24 also serves as a winding base for sense coil 23. LBJ element 25 remains polarized in one state until the field across it is sufficient to reverse its polarity whereupon the magnetic polarity rapidly reverses. The speed of the reversal is essentially independent of the speed of the change in the applied magnetic field, making this sensor relatively speed independent. The reversal of polarity gives rise to a strong narrow pulse from the sense coil 23. Wiegand wire elements perform similarly in effect to the micro-wire LJB elements though slightly differently in internal details.

FIG. 7A through FIG. 7D show stepper motor 31 incorporating both fine sensor pickup coils 6 and 7 and coarse sensing elements 4 and 5 as rotor 32 is incrementally rotated. The arrows shown on rotor 2 and stator 1 have been included only as a reference to help indicate rotation within this sequence of drawings. Such arrows do not physically exist in stepper motor 31.

FIG. 7A: 0 Degrees

Figure 7A:
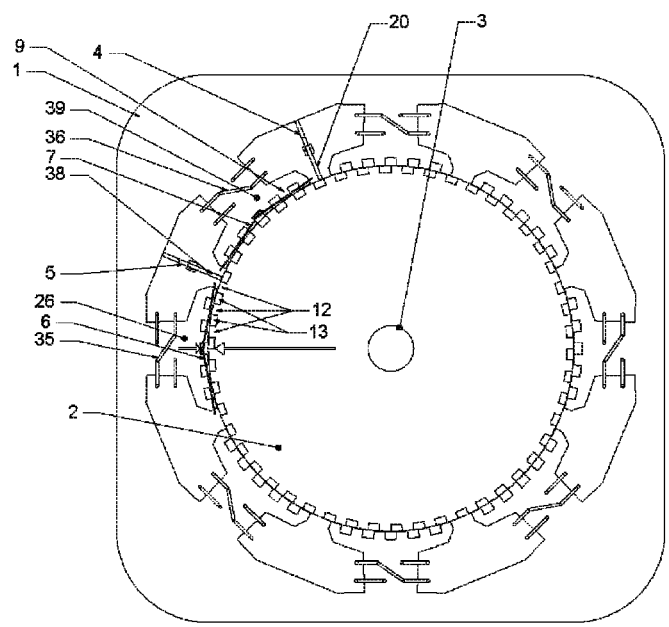
FIGS. 7A, 7B, 7C, and 7D each show a side view of the motor of FIG. 1 as the rotor thereof is moved through successive 0.9 degree counter-clockwise increments of motion.

FIG. 7A corresponds to 0 degree rotation of rotor 32 with respect to stator 1. As shown in FIG. 7A, with 0 degree rotation of rotor 32, rotor teeth 12 of upper rotor pole cap 2 are in maximum coupling and balanced alignment with the adjacent stator pole teeth 9 of phase B stator pole piece 39. The symmetrical arrangement of rotor 32 and stator pole teeth 9 at phase B stator pole piece 39 produces balanced flux paths through both the in phase and reverse phase sections of fine sensor pickup coil 7 resulting in a null output from fine sensor pickup coil 7 when stator phase winding B 36 is pulsed as part of a chopping drive. The resulting output from fine sensor pickup coil 7 is denoted as F2 in FIG. 12, which has a value of zero when rotor 32 has 0 degrees rotation with respect to stator 1.

Phase A stator pole piece 26 has the maximum unbalanced tooth interaction with the three counter-clockwise stator pole teeth of phase A stator pole piece 26 primarily coupled with rotor teeth 12 of upper rotor pole cap 2 while the three clockwise stator pole teeth of phase A stator pole piece 26 are primarily coupled to rotor teeth 13 of lower rotor pole cap 11. This rotor position causes a majority of the flux variation from the pulsing of stator phase winding A 35 by the chopper drive to pass through loops 15 and 18 of fine sensor pickup coil 6, which are in phase with each other, thereby producing an output which is in phase with the pulsing of stator phase winding A 35. This rotor angle with respect to stator 1 produces a maximum output from fine sensor pickup coil 6. This output is denoted by trace F1 in FIG. 12 showing a maximum output at 0 degrees rotation of rotor 32 with respect to stator 1.

Coarse sensing element 5 is aligned with rotor teeth 13 of lower rotor pole cap 11 and is therefore coupled to the magnetic field corresponding to the polarity of the lower side of rotor magnet 10. This field is represented as PHI1 in FIG. 12, and has a negative value at 0 degrees. The negative orientation is to represent lower rotor pole cap 11, although rotor magnet 10, could in fact be polarized in either direction as long as the polarization is known.

Flux focuser 200 of coarse sensing element 4 is aligned with and therefore coupled to rotor teeth 13 of lower rotor pole cap 11. This state of flux is shown as PHI2 in FIG. 12, and is shown as negative at rotation angle 0 degrees.

Figure 7B:
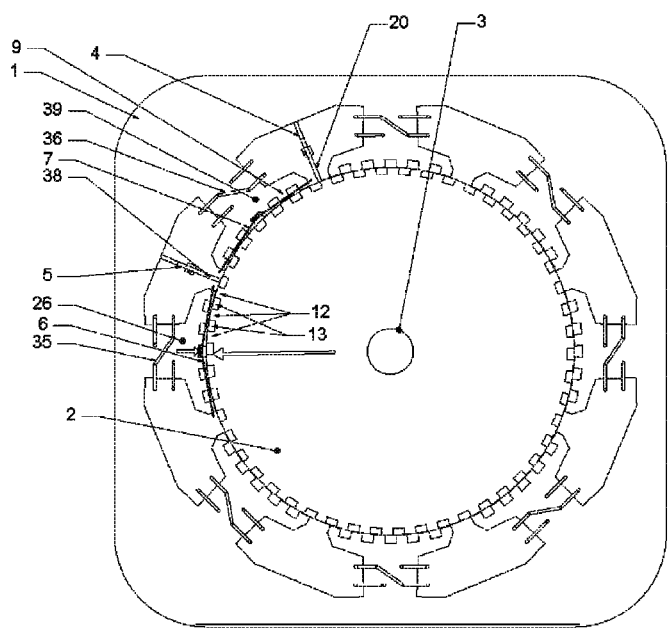

FIG. 7B: 0.9 Degrees

FIG. 7B corresponds to a 0.9 degree mechanical counter-clockwise rotation of rotor 32 with stator 1 held stationary. This corresponds to a one-half step or forty-five degree electrical angle rotation. Neither stator pole teeth 9 of Phase A stator pole piece 26 nor stator pole teeth 9 of Phase B stator pole piece 39 are in the balanced maximal flux alignment location with respect to their nearest rotor teeth 12 and 13. This produces a reduced value for fine sensor pickup coil 6 represented by F1 and a negative going output for fine sensor pickup coil 7 represented by F2 in FIG. 12 at 0.9 degrees rotation. Flux focuser 20 of coarse sensing element 4 is equally coupled to rotor teeth 12 of upper rotor pole cap 2 and to rotor teeth 13 of lower rotor pole cap 11, respectively, when rotor 32 is in this position. This is the approximate triggering point for producing an output pulse for coarse sensing element 4. The triggering is denoted as a pulse on C1 in FIG. 12 at the 0.9 degree rotor angle. A flux focuser 38 of coarse sensing element 5 remains primarily coupled to rotor teeth 13 of lower rotor pole cap 11. As there is no change in the magnetic field impressed across coarse sensing element 5 as compared to the last position, no output pulse is present at C2 in FIG. 12.

Figure 7C:
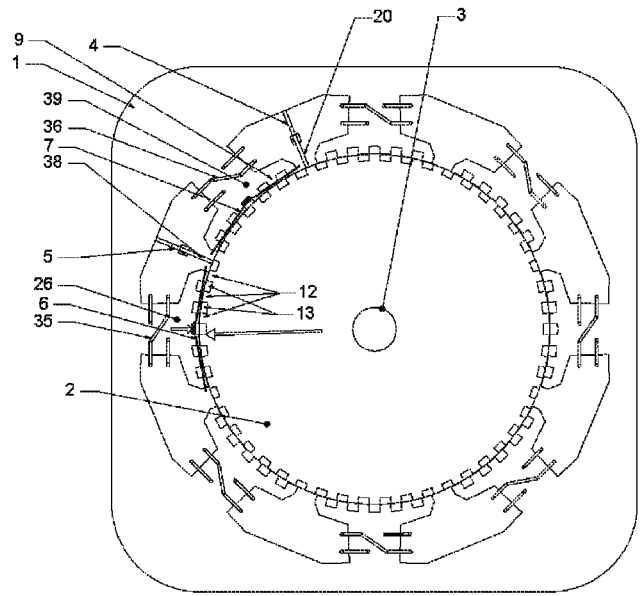

FIG. 7C: 1.8 Degrees

FIG. 7C corresponds to a 1.8 degree mechanical counterclockwise rotation of rotor 2 with stator 1 held stationary. This also corresponds to one full step or 90 degree electrical angle rotation. Stator pole teeth 9 of phase A stator pole piece 26 are now in maximum alignment with rotor teeth 12 of upper rotor pole cap 2. With the flux balanced through the complementary loops of fine sensor pickup coil 6, output F1 is zero in FIG. 12 for 1.8 degree rotation. Stator pole teeth 9 of phase B stator pole piece 39 are now in maximum offset with the clockwise teeth more in alignment with rotor teeth 12 of upper rotor pole cap 2 with the corresponding flux passing through loop 16 of fine sensor pickup coil 7, and with the counterclockwise teeth more in alignment with rotor teeth 13 of lower rotor pole cap 11 with the corresponding flux passing through loop 17 of fine sensor pickup coil 7. This produces the maximum negative response F2 in FIG. 12 at 1.8 degrees rotation. Flux focuser 20 of coarse sensing element 4 is coupled to rotor teeth 12 of upper rotor pole cap 2. Flux focuser of coarse sensing element 5 is coupled to rotor teeth 13 of lower rotor pole cap 11. There is no transition of the field at either coarse sensing element 4 or coarse sensing element 5, and thus no output pulses are present at C1 or C2 in FIG. 12.

Figure 7D:
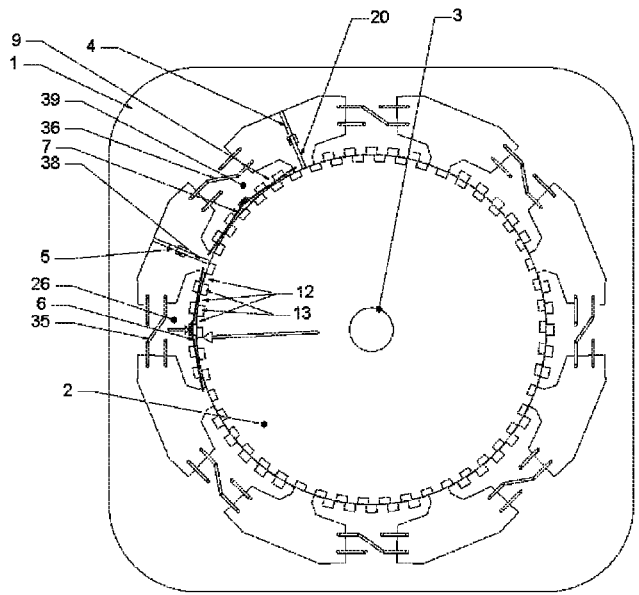

FIG. 7D: 2.7 Degrees

FIG. 7D corresponds to a 2.7 degree mechanical counterclockwise rotation of rotor 2 with stator 1 held stationary. This also corresponds to one and one half full steps or 135 degrees electrical angle rotation. Stator pole teeth 9 of phase A stator pole piece 26 have a greater coupling to rotor teeth 13 of lower rotor pole cap 11 while stator teeth 9 of phase B stator pole piece 26 have a greater coupling to rotor teeth 12 of upper rotor pole cap 2. The majority of the flux variation from the pulsing of stator phase winding A 35 by the chopper drive passes through loops 16 and 17 of fine sensor pickup coil 6, thereby causing a negative signal F1 in FIG. 12 corresponding to 7.2 degrees of rotation. Stator teeth 9 of phase B stator pole piece 39 are still more aligned with rotor teeth 13 of lower rotor pole cap 11, but stator teeth 9 of phase A stator pole piece 26 are becoming more balanced in their coupling between rotor teeth 12 of upper rotor pole cap 2 and rotor teeth 13 of lower rotor pole cap 11. This causes a reduced negative voltage from fine sensor pickup coil 7 at rotation angle of 2.7 degrees of rotor 2. Flux focuser of coarse sensing element 5 is equally coupled to rotor teeth 12 of upper rotor pole cap 2 and rotor teeth 13 of lower rotor pole cap 11. This is the reversal point for magnetic field PHI2 and the approximate triggering point for producing an output pulse C2 in FIG. 12 for coarse sensing element 5 as flux focuser 38 is at the transition point from being primarily coupled to lower rotor pole cap 11 to being primarily coupled to upper rotor pole cap 2 via their respective rotor teeth 13 and 12. Flux focuser 20 of coarse sensing element 4 remains coupled to rotor teeth 12 of upper rotor pole cap 2.

3. Description of Second Exemplary Implementation

Figure 8:
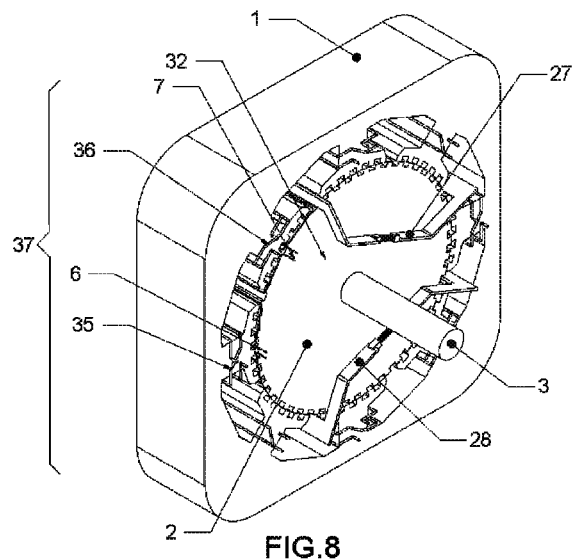
FIG. 8 shows an isometric view of a motor having an alternate configuration of coarse sensing elements in accordance with an embodiment.

FIG. 8 is an isometric view of a stepper motor 37 with integrated fine sensor pickup coils 6 and 7 and coarse bridge sensing elements 27 and 28 in accordance with an alternate implementation. As shown in FIG. 8, stepper motor 37 uses coarse bridge sensing elements 27 and 28 in a bridge arrangement. This bridge arrangement advantageously allows coarse bridge sensing elements 27 and 28 to be moved for ease of construction for some motor types and sizes.

Figure 9:
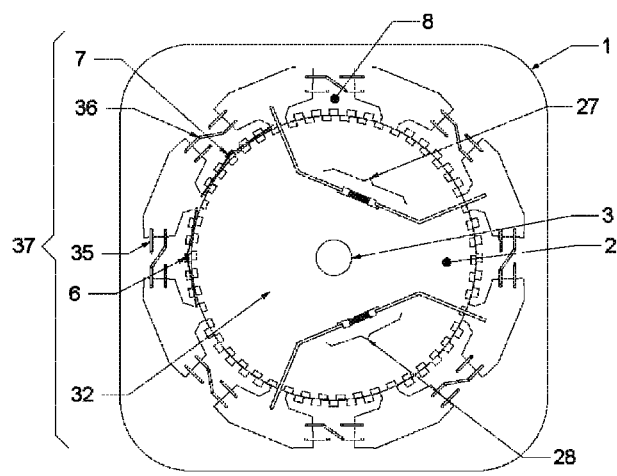
FIG. 9 shows a side view of the motor of FIG. 8.

FIG. 9 is a front face view of stepper motor 37 that uses coarse bridge sensing elements 27 and 28 in a bridge configuration. Coarse bridge sensing elements 27 and 28 play the same role in this configuration as do coarse sensing elements 4 and 5 in stepper motor 31. Note that the counterclockwise end of coarse bridge sensing element 27 is, for the rotor angle shown in FIG. 9, at the transition between coupling to rotor teeth 12 of upper rotor pole cap 2 and rotor teeth 13 of lower rotor pole cap 11 and will transition to being coupled to rotor teeth 12 of upper rotor pole cap 2 as rotor 32 is rotated slightly counterclockwise while stator 1 remains stationary. The clockwise end of coarse bridge sensing element 27 is also shown at the transition between being coupled to rotor teeth 12 of upper rotor pole cap 2 and rotor teeth 13 of lower rotor pole cap 11. A slight counterclockwise rotation of rotor 32 will cause the clockwise end of coarse bridge sensing element 27 to be coupled to rotor teeth 13 of lower rotor pole cap 11. As shown in FIG. 9, the counterclockwise end of coarse bridge sensing element 28 is coupled to rotor teeth 13 of lower rotor pole cap 11, while the clockwise end of coarse bridge sensing element 28 is coupled to rotor teeth 12 of upper rotor pole cap 2.

Figure 10:
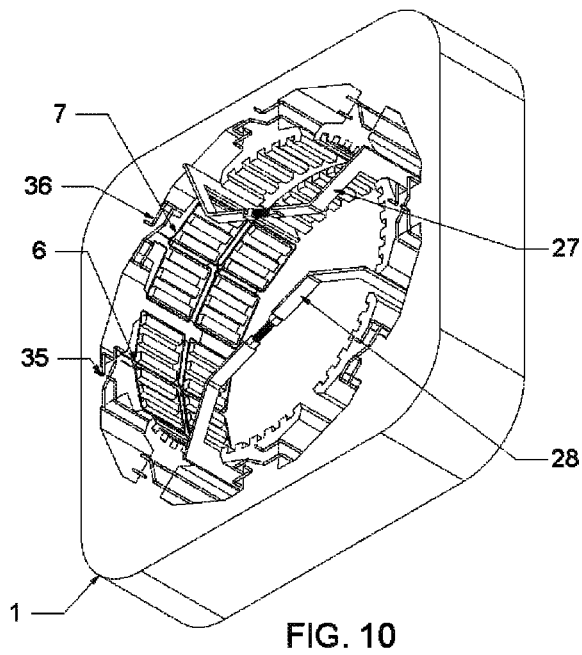
FIG. 10 shows an isometric view of the alternate stator and sensor configuration of the motor of FIG. 8, detailing the positioning of the fine sensor pickup coils and the coarse sensing elements, with the rotor assembly removed for clarity.

FIG. 10 is a rotated view of stepper motor 37 with rotor 32 hidden to provide a better view of the relative placement of coarse bridge sensing elements 27 and 28 and the fine sensor pickup coils 6 and 7 with respect to stator 1. Note that, as with stepper motor 31, there are many combinations of placements for the coarse sensing elements and fine sensor pickup coils. The orientations shown represent just one of the configurations, shown by way of example only.

Figure 11:
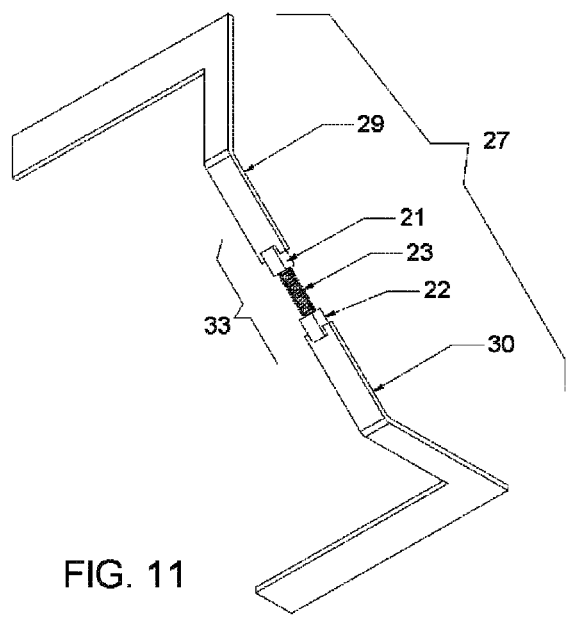
FIG. 11 shows an isolated view of the bridge coarse sensing element used in the motor of FIG. 8.

FIG. 11 provides a detailed view of coarse bridge sensing element 27 in accordance with an embodiment. Coarse bridge sensing element 28 may be similarly constructed. As shown in FIG. 1, coarse bridge sensing element 27 includes a first bridge flux focuser 29 and a second bridge flux focuser 30. First and second bridge flux focusers 29 and 30 provide a high-permeability path for the magnetic fields that are coupled to them by the nearest rotor teeth 12 and rotor teeth 13. The inner ends of first and second bridge flux focusers 29 and 30 direct the collected flux to impress a magnetic field across coarse sensor 33 with sense coil 23 via coarse sensor end caps 21 and 22. When the field across coarse sensor 33 has reversed sufficiently to cause a flip of the state of LBJ element 25, the rapid reversal of the poles within LBJ element 25 within coarse sensor 33 is detected by sense coil 23 in the form of a brief but significant pulse.

FIG. 12 shows typical normalized waveforms for both embodiments (stepper motor 31 and stepper motor 37). F1 and F2 are the normalized sampled waveforms for fine sensor pickup coils 6 and 7, respectively. The F1 and F2 signals are only available when the motor driver is actively driving stator phase winding A 35 and stator phase winding B 36. The F1 and F2 signals are the result of a differential time-correlated sampling of the voltage across fine sensor pickup coils 6 and 7 synchronized with the motor driver chopping signals. The normalized magnetic fields impressed across the coarse sensing elements 4 and 5 of stepper motor 31, or across coarse bridge sensing elements 27 and 28 of stepper motor 37, transition as the edges of rotor teeth 12, 13 transit the centerlines of the respective flux focusers and are not dependent upon the motor windings being driven. In the drawings, the widths of the various flux focusers are shown as being thinner than the rotor teeth to minimize cogging, although this is not required for the operation of the invention. This narrow width gives rise to the truncated sine and cosine waveforms for the two magnetic fields PHI1 and PHI2. These magnetic fields are approximately 1.8 degrees mechanical which is one full step or 90 electrical degrees different in phasing, and each field reverses every 3.6 mechanical degrees of rotation of rotor 32.

In the vicinity of the flux reversals, LBJ element 25 of coarse sensing elements 4 and 5 and coarse bridge sensing elements 27 and 28 rapidly reverses polarity giving rise to pulses C1, C2 on the respective sense coils 23. Note that if Wiegand type elements are used for LBJ element 25, each LBJ element 25 will produce a strong pulse near the zero external flux point as the magnetically soft inner core reverses polarity to the opposite state of polarity as the harder magnetized outer core. A second, smaller pulse will occur as the outer core reverses. Single Brokhausen jump elements, which are a subset of LBJ elements, will produce a pulse after flux reversal when the applied field is strong enough to flip the magnetic polarity of the wire. Although single Brokhausen jump elements are used in one embodiment, embodiments of the invention may also utilize Wiegand style sensor wires or the like.

Figure 13:
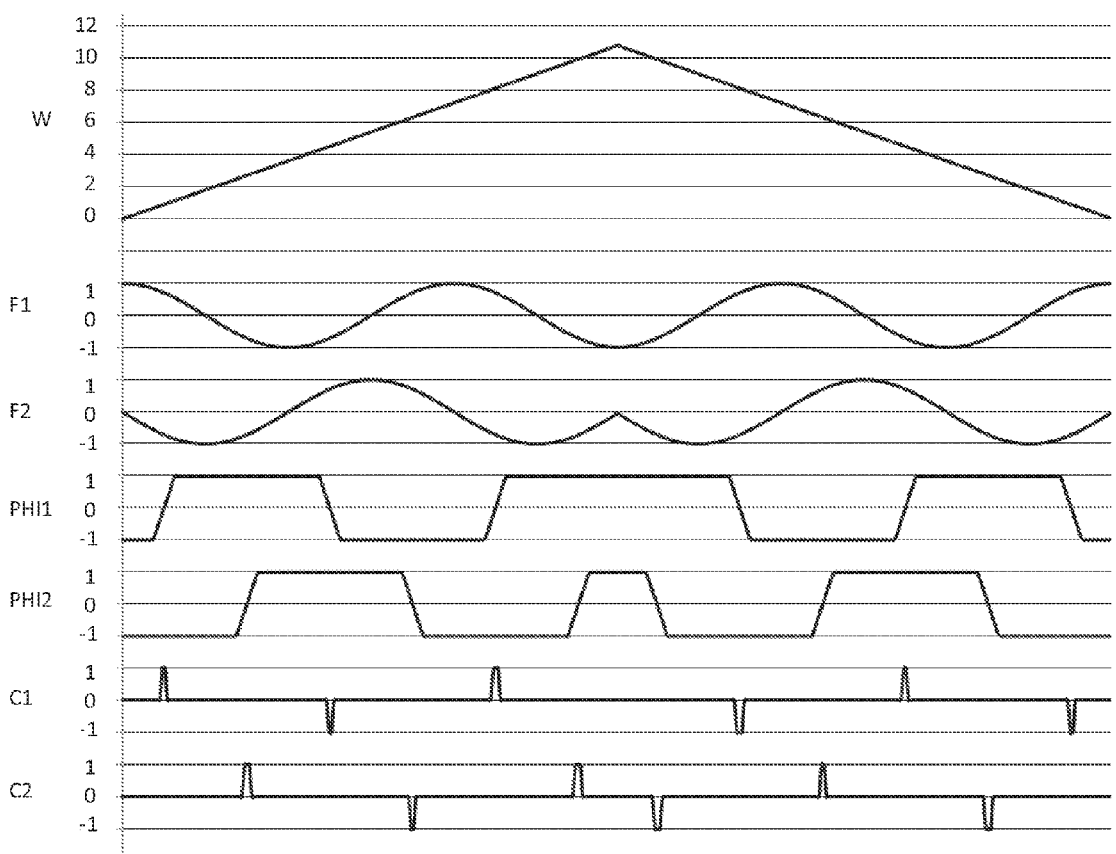
FIG. 13 shows the angular position W in mechanical degrees and the sensor outputs of FIG. 12 as the angle first moves in the positive direction and then reverses and moves in the negative direction.

FIG. 13 repeats the waveforms of FIG. 12 but plots them against an arbitrary time base. The mechanical angle in degrees counter clockwise, W, has been added above the other waveform, in order to show the various signals when moving in either direction of travel.

4. Conclusion

An embodiment of the present invention provides a coarse resolution integrated motor-position sensor. The motor has a rotor assembly including a cylindrical portion having an axis, and the cylindrical portion has a plurality of peripherally-spaced radially-projecting rotor teeth. The motor also has a stator assembly coaxial with the rotor assembly and having a plurality of radially-projecting stator poles, the stator poles each have a plurality of stator teeth projecting radially to a circle coaxial with the rotor assembly, and coils for electrically energizing the stator poles. Two or more large Brokhausen jump sensing elements, such as Wiegand effect sensors or, preferably, single Brokhausen jump sensing elements, such as amorphous magnetostriction wire sensors, are each located between magnetically soft flux directing elements. A first flux directing element is mechanically affixed to the stator and located adjacent to both the upper and lower rotor pole cap teeth. As the rotor rotates with respect to the stator, the first flux directing element is coupled alternatively to the first rotor pole cap and then to the opposing rotor pole cap, according to the relative proximity of the first flux directing element to the teeth of the respective rotor pole cap. The rotor teeth are nominally offset such that where one pole cap would have a tooth in proximity to the first flux directing element, the second pole cap would have a gap. Thus with the use of a single rotor magnet coupled to toothed pole caps, the magnetic field directed to the first flux directing element alternates as the rotor is rotated.

Note that the flux collector could be made with an offset between the upper and lower poles if the teeth of the two rotor caps were made to be aligned, as is occasionally done in some stepper motor configurations. This would not affect the overall operation of embodiments of the present invention.

In two different embodiments of this invention, the second flux directing element associated with each coarse position sensing element may be positioned either to the stator body return magnetic path, or alternately, may be positioned around the periphery of the rotor to where the teeth are magnetically reversed with respect to the first flux directing element. In the case of a typical two phase stator, eight pole piece 1.8 degree stepper motor, this would correspond to being offset by two stator pole piece locations or 90 degrees mechanically. Other stepper motor configurations would use the same method of operation, but might have different angles required to keep the requirement of spanning magnetic reversals described above.

The second coarse position sensing element, in the case of a two sensor system, is similar to the first, but rotated about the center axis of the motor so as to couple to rotor teeth that are approximately 90 electrical degrees out of phase from the first sensing subsystem. If a three coarse sensing element system is desired to provide additional resolution, the three sensors would be optimally located so as to be coupled to rotor teeth that are approximately 120 electrical degrees separated, if the spacing between the output pulses are to be approximately equally spaced versus rotor rotation angle with respect to the stator. Additional coarse position sensors may be applied within the scope of this invention.

Another optional aspect of the invention provides a fine resolution integrated motor-position sensor including a motor comprising a rotor assembly including a cylindrical portion having an axis, the cylindrical portion having a plurality of peripherally-spaced radially-projecting rotor teeth. The motor also includes a stator assembly coaxial with the rotor assembly and having a plurality of radially-projecting stator poles. The stator poles each have a plurality of stator teeth extending radially to a circle coaxial with the rotor assembly. The motor also includes a plurality of driver coils coupled to produce magnetic fields within the stator poles. A plurality of sensing coils are positioned within the motor so as to have varying coupling to the driven stator pole magnetic fields as they couple to the upper and lower rotor pole caps, the coupling varying as a function of rotor position with respect to the stator.

Implementations of the integrated position sensing motor can have significant benefits. The cost of the system can be low. The position sensing system described here requires minimal additions to the magnetics already present in the motor. Only small, lightweight and rugged pickup coils and magnetic pulse wires are added. The absolute position sensing capability allows the motor controller to determine the rotor position at power up. The optional high resolution fine position sensors are useful for extending the position resolution. The integrated position sensors and motor provides dust and oil resistance, and does not use up either of the rotor shaft ends, which may be advantageous in some applications. The integrated position sensors can also be used for motors having hollow rotors and lead screw nut combinations used to provide linear motion from a rotary motor. Not all of these advantages need be achieved in any given implementation of the present invention, but these various advantages are believed to be achievable through practice of aspects of the present invention. In the claims, large Barkhausen jump sensor is intended to be the broader class of magnetic sensors including but not limited to Wiegand wires and glass coated magnetic wires based on large step changes in flux for a small change in the applied magnetic field.

Stepper motors/high pole count synchronous motors typical of the type discussed above are described in U.S. Pat. No. 4,025,810, and U.S. Pat. No. 4,910,475, which patents are hereby incorporated by reference in their entirety and especially for their teachings with respect to the configuration and operation of stepper motors. The high pole count synchronous motors described in those patents can be implemented with differing numbers of stator pole pieces and with different numbers of phases. There are many known improvements and modifications to the basic motor designs described in these patents and the sensors and sensing strategies described in this patent are readily applicable to such improved and modified motors.

Because of the nature of the signals available using this sensing method and the ease with which these signals can be processed, the sensing method or apparatus can provide position information, velocity information or acceleration information about the motor. For the purposes of this disclosure and the claims, all of these characteristics can be identified collectively as position measurements or information.

The preceding discussions have referenced teeth as components of the rotors and stators of motors. In many instances these teeth are physically exposed as shown in the drawings, with air gaps surrounding the metal teeth. Other configurations are known. For example, the gaps between the teeth of a motor, whether rotary or other, can be filled with a non-magnetic compound. In such a configuration, the teeth are clearly those outwardly extending portions of the rotor and/or stator that are functional in the magnetic coupling. In other configurations, the spaces between the magnetic teeth can be filled with permanent magnet elements to enhance the torque of the motor. In such other configurations, the teeth remain readily identifiable as the portions of the rotor or stator that are functional in the varying magnetic coupling between portions of the rotor and portions of the stator.

While the most apparent applications of the present invention will be in closed loop servomotors or quasi closed loop servomotors, open loop applications are readily implemented and could be advantageous, depending on the particular circumstances.

The present invention may be incorporated into a system with some or all of the related electronics integrated into the same physical structure as the motor sensor—that is, an integrated motor design. The present invention may also be incorporated into a system wherein the associated electronics are implemented in one or more separate structures.

The present invention has been described in terms of certain embodiments thereof. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow.

I claim:

1. An integrated motor-position sensor, comprising:
    a motor comprising:
        a rotor assembly comprising an axially polarized rotor magnet between two rotor pole caps with both having a plurality of peripherally-spaced radially-projecting rotor teeth;
        a stator assembly coaxial with the rotor assembly and having a plurality of radially-projecting stator poles, the stator poles each having a plurality of stator teeth projecting radially to a circle coaxial with the rotor assembly, and coils for electrically energizing the stator poles; and
        a plurality of position sensing elements that are energized by flux from the axially polarized rotor magnet of the rotor assembly and a relative motion of the rotor assembly with respect to the stator assembly, wherein each position sensing element comprises:
            a large Barkhausen jump sensor that includes a sense coil that produces pulses responsive to a change in a magnetic field across the large Barkhausen jump sensor; and
            a flux collector that directs magnetic flux having an alternating magnetic polarity from one or more of the rotor teeth to the large Barkhausen jump sensor;
        wherein a relative position of the rotor assembly with respect to the stator assembly is determinable within a fraction of an electrical cycle of the motor.

2. The integrated motor-position sensor of claim 1, further comprising a non-volatile counter that counts the pulses produced by the large Barkhausen jump sensor.

3. The integrated motor-position sensor of claim 2, wherein the non-volatile counter is powered at least in part by the pulses produced by the large Barkhausen jump sensor.

4. The integrated motor-position sensor of claim 2, wherein the non-volatile counter is powered at least in part by a backup power source that provides power when a primary power source is removed.

5. The integrated motor-position sensor of claim 4, wherein the backup power source comprises one or more of:
    one or more batteries; and
    one or more super-capacitors.

6. The integrated motor-position sensor of claim 2, wherein the non-volatile counter is integral to the motor.

7. The integrated motor-position sensor of claim 1, wherein the large Barkhausen jump sensor includes a Wiegand wire.

8. The integrated motor-position sensor of claim 1, wherein the large Barkhausen jump sensor includes a glass-coated microwire.

9. The integrated motor-position sensor of claim 1, further comprising:
    a plurality of high-resolution position sensors integrated into a magnetic structure of the motor and having absolute position-sensing capability over at least a resolution of the position sensing elements, the high-resolution position sensors sensing a portion of a magnetic flux used to position the rotor assembly with respect to the stator assembly, wherein information produced by the high-resolution position sensors can be combined with information produced by the position sensing elements to provide high-resolution position information over an arbitrarily large number of revolutions.

10. The integrated motor-position sensor of claim 1, wherein the large Barkhausen jump sensor includes a sense coil that produces pulses responsive to a sufficient reversal in the magnetic field across the large Barkhausen jump sensor.

11. The integrated motor-position sensor of claim 1, wherein the large Barkhausen jump sensor includes a sense coil that produces pulses responsive to a magnetic flux returning to zero after having reached a sufficient field strength.

12. An integrated motor-position sensor, comprising:
    a motor comprising:
        a rotor assembly comprising an axially polarized rotor magnet between two rotor pole caps with both having a plurality of peripherally-spaced radially-projecting rotor teeth;
        a stator assembly coaxial with the rotor assembly and having a plurality of radially-projecting stator poles, the stator poles each having a plurality of stator teeth projecting radially to a circle coaxial with the rotor assembly, and coils for electrically energizing the stator poles; and
        a plurality of position sensing elements that are energized by flux from the axially polarized rotor magnet of the rotor assembly and a relative motion of the rotor assembly with respect to the stator assembly, wherein each position sensing element comprises:
            a large Barkhausen jump sensor that includes a sense coil that produces pulses responsive to a change in a magnetic field across the large Barkhausen jump sensor;
            a first bridge flux focuser for directing magnetic flux from a first one or more of the rotor teeth to the large Barkhausen jump sensor, and a second bridge flux focuser for directing magnetic flux from a second one or more of the rotor teeth to the large Barkhausen jump sensor;

wherein a relative position of the rotor assembly with respect to the stator assembly is determinable within a fraction of an electrical cycle of the motor.

13. The integrated motor-position sensor of claim 12, further comprising a non-volatile counter that counts the pulses produced by the large Barkhausen jump sensor.

14. The integrated motor-position sensor of claim 13, wherein the non-volatile counter is powered at least in part by the pulses produced by the large Barkhausen jump sensor.

15. The integrated motor-position sensor of claim 13, wherein the non-volatile counter is powered at least in part by a backup power source that provides power when a primary power source is removed.

16. The integrated motor-position sensor of claim 15, wherein the backup power source comprises one or more of:
one or more batteries; and
one or more super-capacitors.

17. The integrated motor-position sensor of claim 13, wherein the non-volatile counter is integral to the motor.

18. The integrated motor-position sensor of claim 12, wherein the large Barkhausen jump sensor includes a Wiegand wire.

19. The integrated motor-position sensor of claim 12, wherein the large Barkhausen jump sensor includes a glass-coated microwire.

20. The integrated motor-position sensor of claim 12, further comprising:
a plurality of high-resolution position sensors integrated into a magnetic structure of the motor and having absolute position-sensing capability over at least a resolution of the position sensing elements, the high-resolution position sensors sensing a portion of a magnetic flux used to position the rotor assembly with respect to the stator assembly, wherein information produced by the high-resolution position sensors can be combined with information produced by the position sensing elements to provide high-resolution position information over an arbitrarily large number of revolutions.

21. The integrated motor-position sensor of claim 12, wherein the large Barkhausen jump sensor includes a sense coil that produces pulses responsive to a sufficient reversal in the magnetic field across the large Barkhausen jump sensor.

22. The integrated motor-position sensor of claim 12, wherein the large Barkhausen jump sensor includes a sense coil that produces pulses responsive to a magnetic flux returning to zero after having reached a sufficient field strength.

* * * * *